US012654800B1

(12) United States Patent
Stanford et al.

(10) Patent No.: US 12,654,800 B1
(45) Date of Patent: Jun. 16, 2026

(54) MOTORIZED MOBILITY SCOOTER

(71) Applicants: Carolsue Stanford, New York, NY (US); Nelly Rodriguez, New York, NY (US)

(72) Inventors: Carolsue Stanford, New York, NY (US); Nelly Rodriguez, New York, NY (US)

( * ) Notice: Subject to any disclaimer, the term of this patent is extended or adjusted under 35 U.S.C. 154(b) by 825 days.

(21) Appl. No.: 17/991,555

(22) Filed: Nov. 21, 2022

(51) Int. Cl.
　B62K 5/007 　(2013.01)
　B62K 5/08 　(2006.01)
　B62K 27/00 　(2006.01)

(52) U.S. Cl.
　CPC ............... B62K 5/007 (2013.01); B62K 5/08 (2013.01); B62K 27/003 (2013.01); *B62K 2202/00* (2013.01)

(58) Field of Classification Search
　CPC ......... B62K 5/025; B62K 5/007; B62K 5/027
　USPC ......................................... 280/400
　See application file for complete search history.

(56) References Cited

U.S. PATENT DOCUMENTS 6,158,542 A * 12/2000 Nolet ....................... B62K 7/04
　　　　　　　　　　　　　　　　　180/206.6
6,655,483 B2 * 12/2003 Hayashi ................... B62M 7/00
　　　　　　　　　　　　　　　　　180/68.1

7,861,735 B2 　 1/2011 Stepaniuk et al.
8,573,625 B2 * 11/2013 Gramme .............. B62K 27/003
　　　　　　　　　　　　　　　　　280/401
8,678,123 B2 * 3/2014 Tako ........................ B62J 17/08
　　　　　　　　　　　　　　　　　180/215
2015/0134142 A1 * 5/2015 Taylor .................... G07C 5/008
　　　　　　　　　　　　　　　　　701/1
2018/0043837 A1 * 2/2018 Soklaski ................ B60R 9/065
2019/0258333 A1 * 8/2019 Markey ................. B62K 23/02

FOREIGN PATENT DOCUMENTS

CN 　　　212828804 U 　* 3/2021

* cited by examiner

*Primary Examiner* — Valentin Neacsu
*Assistant Examiner* — Hosam Shabara
(74) *Attorney, Agent, or Firm* — Sanchelima & Associates, P.A.; Christian Sanchelima; Jesus Sanchelima

(57) ABSTRACT

A motorized mobility scooter including a mobility scooter assembly, a dashboard assembly, and an attachment assembly. The mobility scooter assembly includes a mobility scooter which can be driven through the dashboard assembly. The dashboard assembly is rotatably connected to the scooter. The dashboard assembly includes means to accelerate or decelerate the mobility scooter. The attachment assembly includes a trailer, a basket, and a cane holder. The trailer and the basket can be used to carry goods along with the mobility scooter.

2 Claims, 3 Drawing Sheets

MOTORIZED MOBILITY SCOOTER

BACKGROUND OF THE INVENTION

1. Field of the Invention

The present invention relates to a motorized mobility scooter and, more particularly, to a motorized mobility scooter which allows to charge a device, protect from rain, carry luggage and connect a small trailer therein.

2. Description of the Related Art

Several designs for a motorized mobility scooter have been designed in the past. None of them, however, include a retractable luggage rack and a retractable umbrella to make the mobility scooter portable.

Applicant believes that a related reference corresponds to U.S. Pat. No. 7,861,735 issued for an automatic, retractable, canopy for a mobility scooter. Applicant believes that another related reference corresponds to U.S. Pat. No. 8,573,625 issued for a detachable riding platform which can be coupled to an electric scooter. None of these references, however, teach of an electric mobility scooter that is comprised of an electrically powered, motorized, wheeled vehicle with a seat, hand controls, a headlight, a retractable luggage rack, a USB charging port, a retractable umbrella, a cane holding mechanism, and a hitch mechanism for connecting a small trailer.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorized mobility scooter that includes a retractable umbrella to protect the user against rain.

It is another object of this invention to provide a motorized mobility scooter that includes a charging USB port to charge electronic devices.

It is still another object of the present invention to provide a motorized mobility scooter that includes a hitch mechanism for connecting a small trailer.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
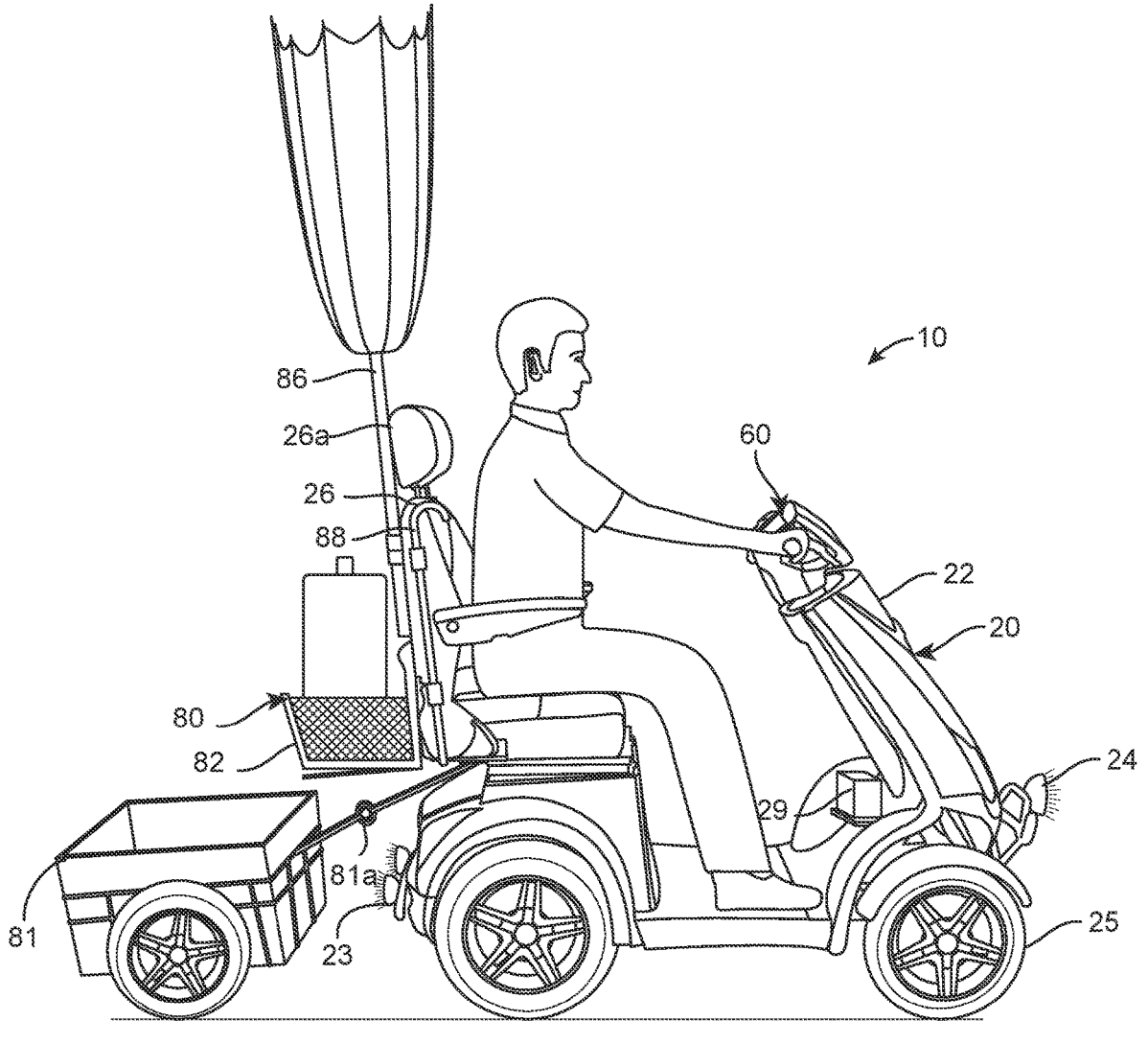
FIG. 1 represents an isometric view of the present invention 10. The present invention includes a mobility scooter assembly 20, a dashboard assembly 60, and an attachment assembly 80.

Referring now to the drawings, where the present invention is generally referred to with numeral 10, it can be observed that it basically includes a mobility scooter assembly 20, a dashboard assembly 60, and an attachment assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The mobility scooter assembly 20 may include a mobility scooter 22, front lights 24, scooter wheels 25, rear lights 23, pedals 21, a locator 29, and a seat 26. In a preferred embodiment the mobility scooter 22 may be a four-wheel scooter. It also may be suitable for the mobility scooter 22 to be a three-wheel scooter. The mobility scooter 22 may be electric propelled. The mobility scooter 22 may have 4 scooter wheels 25. In a preferred embodiment the mobility scooter 22 may be front-wheel drive and rear wheel-drive. The wheels 25 may have a suspension system. The wheels 25 may be exchangeable in the mobility scooter 22.

Figure 3:
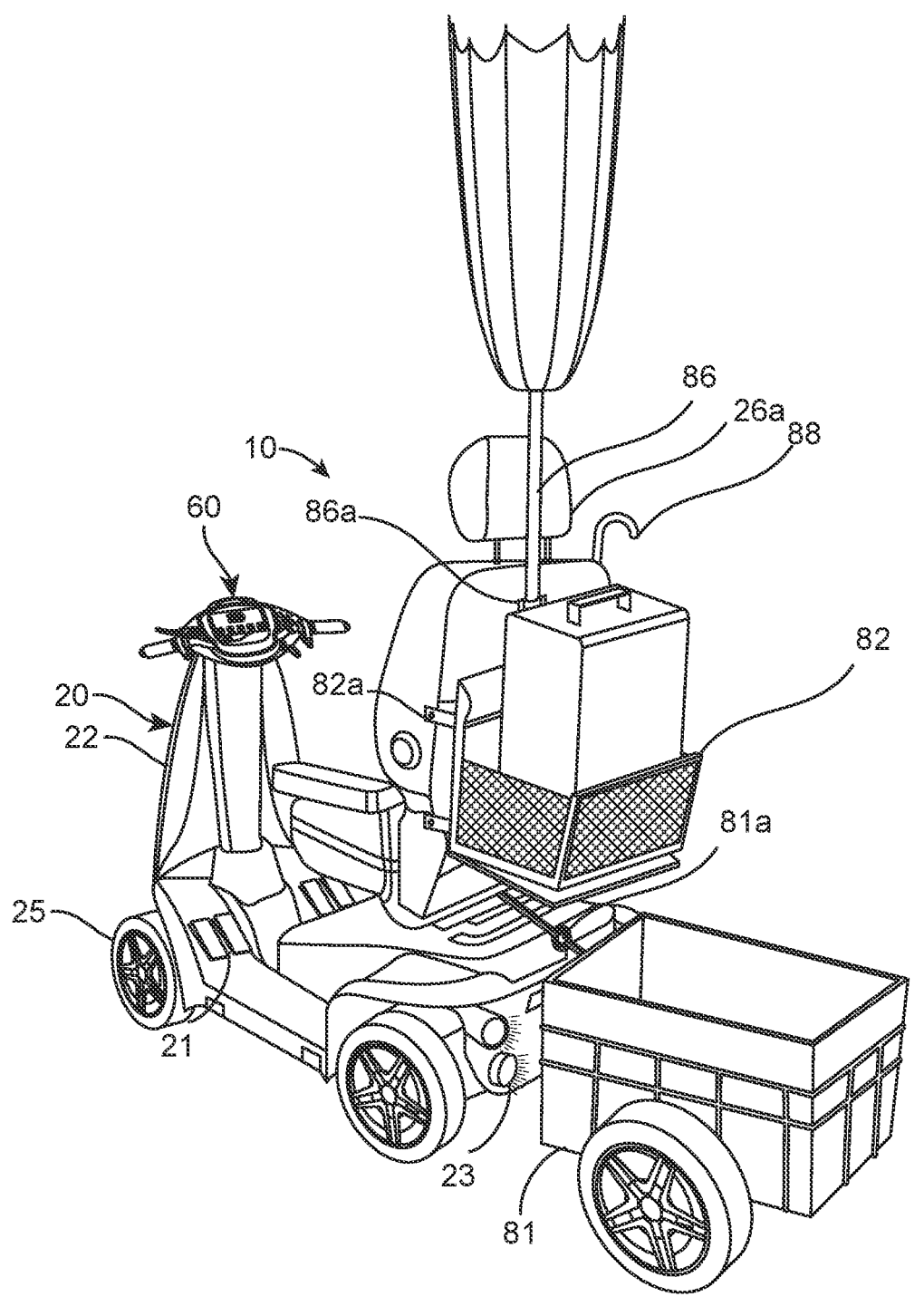
FIG. 3 shows a rear perspective view of the present invention 10.

As illustrated in FIG. 3 the pedals 21 may be located on both sides of the mobility scooter 22. The pedals 21 may include a set of two pedals. One of the pedals 21 may be used to accelerate. Another of the pedals 21 may be used to brake. The pedals 21 may be auxiliary to drive the mobility scooter 22. Preferably the dashboard assembly 60 may be used to drive the mobility scooter 22. The seat 26 may have an adjustable headrest support 26a. The adjustable headrest support 26a may move up and down with respect to the seat 26. The adjustable headrest support 26a may also be removable. In one embodiment the seat 26 protects an storage placed under the seat 26. The seat 26 may be attached to the mobility scooter 22. In a preferred embodiment the front lights 24 may be used to light a darkened area or to indicate that the mobility scooter 22 is advancing. The front lights 24 may be located on a front portion of the mobility scooter 22. The rear lights 23 may be used to alert the presence of the mobility scooter 22 or to indicate that the mobility scooter 22 is going in reverse. The front lights 23 and the rear lights 24 may be light emitting diodes, high-intensity discharge lamps, or any other suitable light known in the prior art. The locator 29 may be located in a bottom portion of the dashboard assembly 60. The locator 29 may be a radionavigation-satellite service. The locator 29 may allow tracking of the device. The locator 29 may be integrated in the mobility scooter 22.

Figure 2:
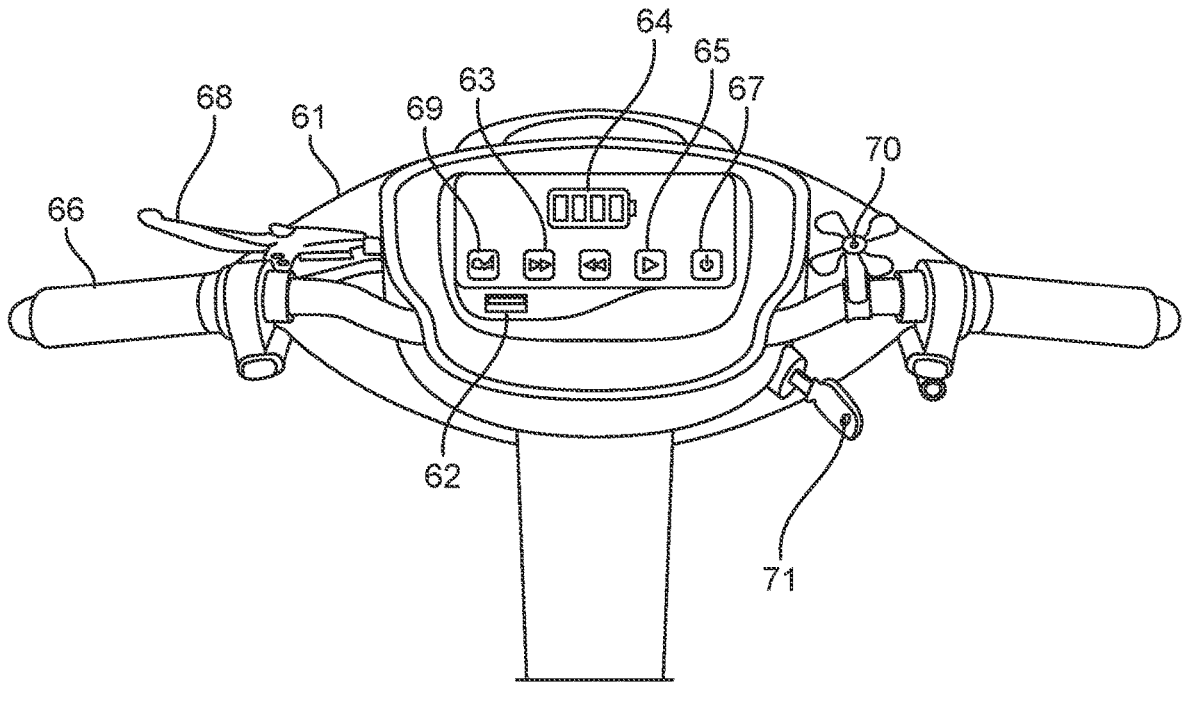
FIG. 2 represents an enlarged view of the dashboard assembly 60.

As best illustrated in FIG. 2 the dashboard assembly 60 may include a throttle 66, a brake lever 68, a dashboard 61, a horn button 69, a forward button 63, a play button 65 a turn on/off button 67, a battery indicator 64, a fan 70, a port 62 and a key 71. Both sides of the dashboard 61 may include throttle 66 and a brake lever 68. The throttle 66 may be used to accelerate and the brake lever 68 to brake. It should be understood that users may use any of the throttles 66 of brake levers 68 to drive the mobility scooter 22. Thus, users may use the left or the right hand to drive the mobility scooter 22. The dashboard 61 may be rotatably attached to the mobility scooter 22. The dashboard 61 may be used to direct the mobility scooter 22 to the right or to the left.

The dashboard 61 may include a plurality of buttons which can be depressed to actuate a predetermined functionality. The horn button 69 may be used to activate a horn (not illustrated in the drawings). The turn on/off button 67 may be used to turn on or turn off the dashboard 61. It also may be suitable for the turn on/off button 67 to be used for turning on or turning off the mobility scooter 22. The dashboard 61 may include a music player. The forward button 63 and the play button 65 may be used to control the music player (not shown in the drawings).

The battery indicator 64 may indicate how much battery is left in the mobility scooter 22. Electric mobility scooters are widely known in the prior art and it should be understood that the battery of the mobility scooter is capable of providing power to each of the listed electronic elements on the dashboard 61. The fan 70 may be actuated to circulate and direct air to the person seated in the mobility scooter 22. The fan 70 may be attached to the dashboard 61. The mobility scooter may preferably turn on by means of the key 71. The key 71 is detachable from the mobility scooter 22.

Referring now to FIG. 3 it can be observed that the attachment assembly 80 includes a trailer 81, a trailer hitch 81a, a basket 82, fasteners 82a, an umbrella 86, a first attaching mean 86a, a cane 88 and a cane holder 88a. The trailer 81 may substantially have a rectangular shape. It also may be suitable for the trailer 81 to have a circular shape, a triangular shape, or any other suitable shape. The trailer 81 may have trailer wheels 81b. The trailer 81 may be hollow. The trailer 81 may be made of metal, plastic, or any other suitable material. The trailer 81 may be a trailer for mobility scooters. The trailer 81 may be a container attached to the mobility scooter 22 by means of the trailer hitch 81a which can be moved along with the mobility scooter 22 by means of the trailer wheels 81b. The trailer 81 may be propelled by the mobility scooter 22. The trailer hitch 81a may extend from a rear portion of the mobility scooter 22. The trailer hitch 81a may be used to attach the trailer 81 to the mobility scooter 22. The trailer hitch 81 may be made of metal, plastic, or any other suitable material.

The basket 82 may be attached to a rear portion of the seat 26 by means of the fasteners 82a. The basket 82 may be used to store and carry any suitable goods. The basket 82 may substantially have a tapered shape. It also may be suitable for the basket 82 to have a circular shape, a triangular shape, or any other suitable shape. The basket 82 may be preferably made of metal. It also may be suitable for the basket 82 to be made of plastic, leather, or any other suitable material.

The first attaching mean 86a may be attached to a rear portion of the seat 26 above the fasteners 82a. The first attaching mean 86 may have a cylindrical shape. The first attaching mean 86a may be hollow. The first attaching mean 86 may be adapted to receive the shaft of umbrella 86 therein. The umbrella 86 may be removably attached to the seat 26 by means of the first attaching mean. In a preferred embodiment the umbrella 86 is an inverted umbrella. The umbrella 86 can be folded down and expanded when not in use.

The cane holder 88a may be located on the left side of seat 26 or on the right side of seat 26. It also may be suitable for the cane holder 88a to have any other configuration in the seat 26. The cane holder 88a may have a cylindrical shape. It also may be suitable for the can holder 88 to have a rectangular shape, or any other suitable shape. The cane holder 88a may be hollow. The cane holder 88a may be suitable to receive a cane 88 thereinto. The cane holder 88a may be made of plastic, metal, or any other suitable material.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A motorized mobility scooter, comprising:
   a mobility scooter assembly, wherein said mobility scooter assembly includes a mobility scooter, wherein said mobility scooter is motorized, said mobility scooter has pedals on both sides thereof, wherein said pedals on both sides are auxiliary foot controls configured to operate in combination with hand controls on a dashboard assembly, said pedals are operated to accelerate or reduce speed, said mobility scooter includes a seat;
   a dashboard assembly, wherein said dashboard assembly includes at least one throttle, at least one brake lever and a dashboard, wherein said at least one throttle and said at least one brake lever are attached to sides of said dashboard, wherein said dashboard includes throttles and brake levers on both left and right sides of said dashboard to allow ambidextrous control by a user, wherein said throttle is operated to increase speed of said mobility scooter, said brake lever is operated to reduce speed of said mobility scooter, said dashboard is rotatably attached to a front portion of said mobility scooter, said dashboard is operated to direct the mobility scooter to the right or the left, said dashboard includes a fan attached thereto, said fan is configured to circulate and direct air to a person seated in said mobility scooter, said dashboard includes a port, wherein a mobile device is capable of being connected to said dashboard by means of said port, wherein said mobility scooter is configured to provide power to said mobile device; and
   an attachment assembly, wherein said attachment assembly includes a trailer, a basket, and a cane holder, wherein said trailer, said basket and said cane holder are attached to said mobility scooter.

2. A motorized mobility scooter, consisting of:
   a mobility scooter assembly, wherein said mobility scooter assembly includes a mobility scooter, wherein said mobility scooter is motorized, said mobility scooter has pedals on both sides thereof, wherein said pedals on both sides are auxiliary foot controls configured to operate in combination with hand controls on a dashboard assembly, said pedals are operated to accelerate or reduce speed, said mobility scooter includes a seat, said seat has a headrest, said headrest is height adjustable, said mobility scooter includes a locator integrated therein, said locator is a radionavigation-satellite service configured to allow tracking of said mobility scooter, said mobility scooter includes front lights and rear lights;
   a dashboard assembly, wherein said dashboard assembly includes a port, a battery indicator and a dashboard, wherein said dashboard includes throttles and brake levers on both left and right sides of said dashboard to allow ambidextrous control by a user, wherein said throttle is operated to increase speed of said mobility scooter, said brake lever is operated to reduce speed of said mobility scooter, said dashboard is rotatably attached to a front portion of said mobility scooter, said dashboard is operated to direct the mobility scooter to the right or the left, wherein a mobile device is capable of being connected to said dashboard by means of said port, wherein said mobility scooter is configured to provide power to said mobile device, said battery indicator is adapted to indicate how much charge is left in said mobility scooter; said dashboard includes a fan attached thereto, said fan is configured to circulate and direct air to a person seated in said mobility scooter, said dashboard includes a music player and a set of buttons, said set of buttons are configured to operate said music player, said dashboard includes a key, said key is detachable from said mobility scooter and is configured to turn on said mobility scooter; and an attachment assembly, wherein said attachment assembly includes a trailer, a basket, a first attaching means, and a cane holder, wherein said trailer, said basket and said cane holder are attached to said mobility scooter, wherein said cane holder is fixed to a lateral side of said seat, said cane holder is adapted to insert a cane thereinto, said first attaching means, said first attaching means has a cylindrical shape, said first attaching means is adapted to receive an umbrella therein, said first attaching means is located on a rear portion of said seat, wherein said trailer is attached to a rear portion of said mobility scooter by means of a trailer hitch.

* * * * *